(12) United States Patent
Henze

(10) Patent No.: US 10,556,754 B2
(45) Date of Patent: Feb. 11, 2020

(54) INSTALLATION METHOD FOR SETTING UP CONVEYING DEVICES

(71) Applicant: INTERROLL HOLDING AG, Sant' Antonino (CH)

(72) Inventor: Herbert Henze, Wermelskirchen (DE)

(73) Assignee: INTERROLL HOLDING AG, Sant' Antonino (CH)

( * ) Notice: Subject to any disclaimer, the term of this patent is extended or adjusted under 35 U.S.C. 154(b) by 0 days.

(21) Appl. No.: 15/567,737

(22) PCT Filed: Apr. 20, 2016

(86) PCT No.: PCT/EP2016/058719
§ 371 (c)(1),
(2) Date: Oct. 19, 2017

(87) PCT Pub. No.: WO2016/169962
PCT Pub. Date: Oct. 27, 2016

(65) Prior Publication Data
US 2018/0127217 A1    May 10, 2018

(30) Foreign Application Priority Data

Apr. 20, 2015 (DE) .................. 10 2015 106 034

(51) Int. Cl.
*B65G 43/10* (2006.01)
*G05B 19/042* (2006.01)
(Continued)

(52) U.S. Cl.
CPC ............ *B65G 43/10* (2013.01); *B65G 43/00* (2013.01); *G05B 19/0426* (2013.01);
(Continued)

(58) Field of Classification Search
CPC ..................................................... B65G 43/10
See application file for complete search history.

(56) References Cited

U.S. PATENT DOCUMENTS 5,180,344 A    1/1993    Hall
5,442,248 A    8/1995    Agnoff
(Continued)

FOREIGN PATENT DOCUMENTS

AT              13066        5/2013
CN           2033808 U      3/1989
(Continued)

*Primary Examiner* — Thomas Randazzo
(74) *Attorney, Agent, or Firm* — Price Heneveld LLP

(57) ABSTRACT

The invention relates to an installation method for setting up a control unit in a conveying device, wherein a first control unit controls an upstream first conveyor segment and a second control unit controls a downstream second conveyor segment. The method according to the invention comprises the steps of: placing an object on a first conveyor segment; activating a learning mode in a first and second control unit; activating a first and second conveyor drive by means of the respective first and second control unit; automatically conveying the object in the direction of the second conveyor segment; and storing an installation parameter in the second control unit depending on the triggering of the first or second sensor signal.

30 Claims, 7 Drawing Sheets

(51) Int. Cl.
    *G05B 19/418* (2006.01)
    *H04L 29/12* (2006.01)
    *B65G 43/00* (2006.01)

(52) U.S. Cl.
    CPC ..... *G05B 19/4186* (2013.01); *G05B 19/4189* (2013.01); *H04L 61/2038* (2013.01); *B65G 2203/0266* (2013.01); *G05B 2219/23193* (2013.01); *G05B 2219/25092* (2013.01); *G05B 2219/25204* (2013.01); *G05B 2219/2621* (2013.01)

(56) References Cited

U.S. PATENT DOCUMENTS

| | | | |
|---|---|---|---|
| 5,485,590 A | 1/1996 | Hyatt et al. | |
| 5,530,643 A * | 6/1996 | Hodorowski | G05B 19/0421 700/83 |
| 6,117,318 A | 9/2000 | Simonelli | |
| 6,124,656 A | 9/2000 | Jensen | |
| 6,240,335 B1 | 5/2001 | Wehrung et al. | |
| 6,633,278 B1 | 10/2003 | Hoegener et al. | |
| 6,672,449 B2 | 1/2004 | Nakamura et al. | |
| 6,701,214 B1 | 3/2004 | Wielebski et al. | |
| 7,207,433 B2 | 4/2007 | Schaefer | |
| 8,006,829 B2 | 8/2011 | Itoh et al. | |
| 8,381,901 B2 | 2/2013 | Yamamoto | |
| 8,757,363 B2 | 6/2014 | Combs et al. | |
| 9,359,142 B2 | 6/2016 | Jepsen | |
| 9,618,056 B2 | 4/2017 | Itoh | |
| 9,731,900 B2 | 8/2017 | Ruggeri | |
| 2002/0010527 A1 | 1/2002 | Wielebski et al. | |
| 2004/0144623 A1 | 7/2004 | Newsom et al. | |
| 2006/0293782 A1 | 12/2006 | Rees | |
| 2007/0197072 A1 | 8/2007 | Hvidberg et al. | |
| 2007/0252716 A1 * | 11/2007 | Burger | H02M 7/493 340/635 |
| 2008/0270427 A1 | 10/2008 | Franke et al. | |
| 2010/0322473 A1 | 12/2010 | Taylor et al. | |
| 2012/0024669 A1 * | 2/2012 | Danelski | B65G 43/10 198/617 |
| 2012/0175223 A1 * | 7/2012 | Breen | B65G 43/10 198/459.8 |
| 2012/0175225 A1 * | 7/2012 | Breen | B65G 43/10 198/571 |
| 2012/0211330 A1 * | 8/2012 | Ziegler | B65G 43/10 198/464.4 |
| 2012/0259436 A1 * | 10/2012 | Resurreccion | G05B 23/0216 700/17 |
| 2012/0290126 A1 * | 11/2012 | Combs | B65G 43/10 700/230 |
| 2013/0134017 A1 | 5/2013 | Hall et al. | |
| 2013/0168316 A1 | 7/2013 | Noguchi et al. | |
| 2013/0190915 A1 | 7/2013 | Choo et al. | |
| 2014/0156063 A1 | 6/2014 | Neiser et al. | |
| 2014/0277698 A1 * | 9/2014 | Combs | B65G 43/10 700/230 |
| 2015/0068874 A1 | 3/2015 | Jepsen et al. | |
| 2015/0151921 A1 | 6/2015 | Collot | |
| 2016/0080526 A1 | 3/2016 | Meyer-Graefe | |
| 2016/0318714 A1 * | 11/2016 | Reischl | H04L 61/2038 |
| 2018/0009607 A1 | 1/2018 | Tiedemann | |

FOREIGN PATENT DOCUMENTS

| | | | |
|---|---|---|---|
| CN | 2199164 Y | 5/1995 | |
| CN | 1802614 | 7/2006 | |
| CN | 203682423 U | 7/2014 | |
| CN | 105438565 | 3/2016 | |
| CN | 106154985 | 11/2016 | |
| DE | 3538173 | 1/1987 | |
| DE | 4230729 | 3/1993 | |
| DE | 69306884 | 5/1997 | |
| DE | 102006054575 | 9/2008 | |
| DE | 102008053557 | 9/2009 | |
| DE | 202009012821 | 2/2011 | |
| DE | 202009012822 | 2/2011 | |
| DE | 202012000793 | 4/2012 | |
| DE | 10 2010 044 027 | 5/2012 | |
| DE | 10 2011 004 802 | 8/2012 | |
| DE | 102011109531 | 2/2013 | |
| DE | 102013207760 A1 * | 10/2014 | G05B 19/0423 |
| DE | 102015106026 | 8/2016 | |
| DE | 102015104130 | 9/2016 | |
| DE | 102015106034 | 10/2016 | |
| DE | 102015106024 | 11/2016 | |
| DE | 102015107167 | 11/2016 | |
| DE | 102015114030 | 3/2017 | |
| EP | 1021664 | 1/2002 | |
| EP | 1454851 | 9/2004 | |
| EP | 1656312 | 5/2006 | |
| EP | 2455310 | 5/2012 | |
| EP | 3212543 A1 | 9/2017 | |
| JP | 2003026603 | 1/2003 | |
| JP | 2003104534 | 4/2003 | |
| JP | 2004098554 | 4/2004 | |
| JP | 2014516895 | 7/2014 | |
| JP | 2014142740 | 8/2014 | |
| WO | 0203153 | 1/2002 | |
| WO | 02098768 | 5/2002 | |
| WO | 2010142029 | 12/2010 | |
| WO | 2012113922 | 8/2012 | |
| WO | 2012154650 | 11/2012 | |
| WO | 2013000006 | 1/2013 | |
| WO | 2013000006 A2 | 1/2013 | |
| WO | 2014011459 | 1/2014 | |
| WO | 2014057984 | 4/2014 | |
| WO | 2016066495 A1 | 5/2016 | |
| WO | 2016169982 | 10/2016 | |
| WO | 2016169986 | 10/2016 | |
| WO | 2016177906 | 10/2016 | |
| WO | 2014178399 | 2/2017 | |
| WO | 2018009607 A1 | 1/2018 | |

* cited by examiner

INSTALLATION METHOD FOR SETTING UP CONVEYING DEVICES

CROSS-REFERENCE TO FOREIGN PRIORITY APPLICATION

The present application claims the benefit under 35 U.S.C. § 119(b) of PCT/EP2016/058719, filed Apr. 20, 2016, which claims priority to German Application No. 102015106034.5, filed Apr. 20, 2015, entitled "Installation Method for Setting Up Conveying Devices."

FIELD OF THE INVENTION

The invention relates to an installation method for setting up a control unit in a conveying device, wherein a first control unit controls an upstream first conveyor segment and a second control unit controls a downstream second conveyor segment. The first conveyor segment comprises a first conveyor drive for conveying an object through the first conveyor segment and a first sensor unit for detecting an object at a position within the first conveyor segment. The first conveyor drive and the first sensor unit are also in signal communication with the first control unit in order to control the first conveyor drive and to receive a first sensor signal from the first sensor unit. The structure of the second conveyor segment is analogous, in respect of the aforementioned features, to that of the first conveyor segment.

BACKGROUND OF THE INVENTION

Conveying devices and methods for operating them are basically known from EP1656312B1 or AT13066U1, for example. Conveying devices are used in conveyor systems in which logistics processes run fully and semi-automatically. Parcels, pallets, goods, and other merchandise are conveyed from an entry point to an exit point by means of conveying devices. In complex conveyor systems, the entry points and exit points are sometimes far apart. Larger conveying devices are therefore subdivided into several conveyor segments arranged in a series, one after the other, thus forming a conveyor line that conveys goods downstream from the entry point to their exit point. Conveyor lines can be installed parallel to each other and may be interconnected by means of mergers, singulators, lowerators, or elevators. This results in complex conveying devices consisting of several conveyor segments. In principle, each conveyor segment can have a separate control unit disposed in a housing, or the control units for several neighbouring conveyor segments may be combined in a common control module.

In many cases, a conveyor segment is also fitted with a sensor unit which provides information, in the form of a "busy" signal, about whether a conveyor segment is busy conveying an article or whether it is idle. Typical sensors used in this connection include photo-electric barriers, photoelectric sensors, optical scanners, and proximity switches. During operation of a conveyor system, this information is needed for monitoring and planning the flow of goods. Each conveyor segment has a conveyor drive, for example, roller drives, belt drives, and vibration drives, inter alia. In order to drive each one individually, each conveyor segment is in signal communication with a control unit.

Equipping such conveying devices with a central controller is basically known from the prior art. In such a central control system, a centrally arranged controller, for example, a programmable logic controller (PLC), is responsible for controlling the conveying process within the conveying device or within a section of the conveying device. The central controller sends commands via bus communication to individual control units for that purpose. This typically includes commands for activating and deactivating a conveyor drive, parameter specifications for the speed of a conveyor drive, and the like. For its part, the central controller receives signals, for example, a "busy" signal, from the control units. In this kind of central control system, all the logical handling of the conveying process is performed in the central controller, and the individual control units merely serve to implement commands and to respond to sensor signals.

In addition to this centralised form of control, a decentralised form of control is also known. In a decentralised control system, logical handling of the conveying process is delegated to the individual control units. To that end, the control units exchange signals among each other, for example, neighbouring control units may be informed that the next downstream conveyor segment, at least, is busy or is ready to receive goods. Depending on the kind of signal thus received about the neighbouring downstream conveyor segment being busy or having an uptake capacity, a control unit activates the conveyor drive connected to it, in order to transport the objects over the conveyor line without collisions occurring.

It is possible, in principle, to implement hybrid forms of control, consisting of centralised and decentralised control, in which parts of the logic are provided centrally and parts of the logic are provided decentrally. Regardless of the form of control applied in operation, it is necessary for each conveyor segment to be individually configured whenever a new conveying device is installed. This involves and consumes a significant amount of work and time, because it requires that many parameters be set in order to configure the control units. Setting up complex conveying devices also requires skilled personnel. Due to the complexity involved, the likelihood is nevertheless great that individual control units are incorrectly configured, which, in turn, may consume additional time and expense troubleshooting for defects.

If conveyor lines of existing conveying devices are extended or modified in connection with expansion or restructuring measures, it is important that the required installation steps can be carried out expeditiously and reliably. Downtimes of the conveying device should be reduced to a minimum, thus minimising the commercial losses associated with such downtimes.

One requirement to be met by conveying devices nowadays is therefore that little time is needed to configure the conveying device.

SUMMARY OF THE INVENTION

This object is achieved, according to the invention, by a method of the kind initially specified, the method comprising the following steps: (i) placing an object onto the first conveyor segment; (ii) activating a learning mode in the first and second control unit; (iii) activating the first and second conveyor drive by means of the respective first and second control unit; (iv) automatically conveying the object in the direction of the second conveyor segment; and (v) storing an installation parameter in the second control unit depending on the triggering of the first and/or second sensor signal.

A control unit should be understood to mean an electronic circuit which controls and monitors a conveyor segment. A control unit can also control and monitor several such conveyor segments. Furthermore, a sensor signal should be understood to be a signal value that is generated by a sensor unit and which represents the presence or absence of an object within a conveyor segment. Any component that can generate such a signal, for example, a photoelectric barrier, a photoelectric sensor, or a proximity switch, can be used as a sensor unit. An installation parameter should be understood, at the least, to be a data value that can be stored in a control unit and which contains information that is needed when installing the conveying device or that is ascertained during such installation. Individual bus addresses, parameters for configuring the conveyor drives, or parameters for configuring a control unit can be understood as examples of such parameters. Triggering the sensor signal can be understood to be a change in the signal value at the output terminal of a sensor unit, said change preferably having a rising or a falling edge. Failure of the sensor signal to appear should be understood to be the failure of a change in the signal value at the output terminal of a sensor unit, for example, the failure of a rising or falling signal edge to appear.

The method according to the invention allows conveying devices to be installed both systematically and automatically, and the method is equally suitable for commissioning a newly installed conveyor system or to configure an existing, modified system, for example, a system that has been extended or reduced in size. In a first step of the method, an object is placed onto the first conveyor segment of a conveyor line. The object can be, for example, a parcel, a carton, or a transport tray. In principle, any object that does not exceed the physical dimensions of the conveying device, and preferably of a conveyor segment, and that can be conveyed without the risk of being jammed by the conveying device, can be used in this method. It is preferred that the object is predetermined in its dimensions and is smaller than a conveyor segment.

After an object has been placed on the first conveyor segment, the first and the second control units are put into a learning mode. This learning mode entails the control units being able to receive and process special instructions and commands via bus communication. In the course of activating the learning mode in the first control unit, the first and second conveyor drives are activated by the first and the second control units, respectively. This can occur simultaneously or with a timing offset. This may be done, more specifically, by activating all the conveyor drives of the conveying device. As a result, the object placed on the first conveyor segment is conveyed downstream as far as the exit area of the first conveyor segment and further into the entry area of the second conveyor segment, until it finally lies fully on the second conveyor segment. The first and second sensor signals are triggered by the object being conveyed through the first and second conveyor segments. When triggering of the first and/or second sensor signal is detected in the first and/or second control unit, respectively, an installation parameter is stored in the first and/or second control unit. The first and second control units recognise that they are immediately adjacent to each other. Because storage of the installation parameters is associated with conveying of the object, the process of installing a conveying device can be associated with transportation of an object. This simplifies the process of installing a complex conveyor system having a plurality of conveyor segments, thus reducing the time and expenditure required for the installation process. One particular reason for this is that any manual activities performed by a user in order to configure all the conveying devices of a conveyor line can be limited to placing the object onto the first conveyor segment and activating the learning mode, since any installation parameters that are required are automatically stored in the control units. It is preferred that the learning mode is activated at the control unit from which the object is to be conveyed downstream.

In addition to saving time and preventing faulty configuration, one advantage of the method described is that the described installation method for setting up conveying devices can also be carried out by non-experts. The method according to the invention is also particularly advantageous in that the neighbourhood relationships of the conveyor segments within a conveyor line can be identified and automatically recognised on the basis of the sequence in which the sensor signals are triggered. Knowledge about the neighbourhood relationships of conveyor segments in a conveyor line is necessary to operate the conveyor system.

According to another preferred embodiment, it is preferred that the following steps are carried out in step (v): generating in the first control unit a delivery message containing bus address information; sending the delivery message from the first to the second control unit via bus communication; and assigning an individual bus address derived from the bus address information to the second control unit by storing the individual bus address as an installation parameter in the second control unit when a second sensor signal is triggered by the object.

During automatic conveying of the object in the direction of the second conveyor segment, a delivery message containing the bus address information is generated in the first control unit. The bus address information may contain an individual bus address or a code from which an individual bus address can be generated. This individual bus address must be assigned to a control unit so that a control unit can be addressed via bus communication. This bus address information is preferably a digit sequence, an alphanumeric string or a character string, or a combination of said strings. The delivery message may include, for example, an individual bus address to be assigned to the second control unit. The delivery message may likewise include the individual bus address of the first control unit, on the basis of which an individual bus address for the second control unit is calculated in the second control unit by means of an algorithm.

While the object is being conveyed through the first conveyor drive in the direction of the second conveyor segment, the first control unit can send the delivery message via bus communication from the first control unit to the second control unit. This is done, for example, by periodically sending the delivery message via bus communication. Transmission of the delivery message may also be triggered in response to a predefined condition, for example, by a sensor signal being triggered in the first or second conveyor segment. As soon as the object has been conveyed into the second conveyor segment by the first and second conveyor drives and triggers a second sensor signal in the second conveyor segment, an individual bus address can be assigned to the second control unit from the bus address information and stored as an installation parameter in the second control unit. For example, the second control unit receives the delivery message sent periodically from the first control unit and processes that message when the second sensor unit is activated by the object and triggers the second sensor signal. Once it has been instructed and has stored an individual bus address, the second control unit can be addressed and, therefore, configured and controlled via bus communication. If there are other conveyor segments in the conveyor line, the object is conveyed further, and the steps described are successfully applied to other downstream conveyor segments.

The control units, which are generally made identical, do not initially have an individual bus address by means of which they can be addressed via bus communication. This installation parameter is usually defined in initial manual configuration of the control units of a conveying device. The method according to the invention makes it easier to assign individual bus addresses automatically, reliably, and promptly to the control units and is, therefore, a preferable method for semi-automatic commissioning of conveying devices.

In order to describe how the aforementioned method operates, it was assumed that the direction of rotation that conveys an object downstream is known beforehand, for example, as a consequence of a predetermined installed position of the conveyor drive. That prerequisite is not always met in a conveying device, however. Variability of the configuration or the installed position of the conveyor drives gives rise to the problem that the downstream direction of rotation is not clearly specified beforehand, and/or that it cannot be controlled in a clear-cut manner. The aforementioned method can be developed by automatically determining the direction of rotation of the first conveyor drive that is required to convey products downstream towards the second conveyor segment, which is done by detecting, in step (iv), a preferred direction of rotation of the first and/or of the second conveyor drive such that the object is conveyed downstream, said detection comprising the steps of:

a. conveying the object;
b. triggering of the first and/or second sensor signal by the object;
c. detecting by means of the first control unit that the first and/or second sensor signal has been triggered;
d. if necessary, reversing the direction of rotation of the first and/or second conveyor drive, depending on the first and/or second sensor signal; and
e. storing in the first control unit a first or second direction of rotation of the first conveyor drive as a downstream direction of rotation.

A downstream direction of rotation should be understood to be a direction of rotation of the first and/or second conveyor drive such that the object is conveyed downstream. The second sensor signal can be detected in the first control unit via bus communication. Sensor signals can be retrieved, for example, by the first control unit from the second control unit via bus communication, or the second control unit sends the sensor signal, for example when the signal changes, via bus communication to the first control unit. This also applies analogously for the second control unit.

Activation of the first and second conveyor drives by the first and second control units does not guarantee in every case that the object will be conveyed in the direction of the second conveyor segment. The direction in which the object is conveyed is dependent, in particular, on the direction of rotation of the conveyor drive, which depends, for example, on the installed position of the conveyor drive in the conveying device, on the polarity of the supply voltage of the conveyor drive, or on its wiring. For that reason, activating the first conveyor drive in a first direction of rotation does not inevitably mean that the object will be conveyed in the direction of the second conveyor segment. It may also be necessary, due to design limitations, to mount a sensor unit at a suitable position within a conveyor segment. Specific implementation may result, in particular, in mounting positions in which the sensor unit is mounted upstream from the middle of a conveyor segment or downstream from the middle of a conveyor segment.

Various cases may thus arise in which the directions of rotation of the conveyor drives and the mounting position of the sensor units vary, which makes it more complicated to detect automatically the direction of rotation that the conveyor drives must have in order to convey products downstream. For example, the following cases may arise because the directions of rotation when activating a conveyor drive are not known, and because the mounting position of the sensor unit is not known:

(a) The simplest case that arises is when the first sensor unit is mounted down-stream from the middle of the first conveyor segment and a user places the object onto the first conveyor segment in such a way that this downstream sensor unit is not triggered (i.e., the object is not placed in the region of the sensor unit), and the first conveyor drive conveys the object downstream after being activated in a first direction of rotation, with the result that the first sensor signal is triggered. Due to the first sensor signal being triggered, the first direction of rotation in which the conveyor drive is activated is stored in the first control unit as the required direction of rotation for conveying products downstream.

(b) Another case arises when the first sensor unit is mounted upstream from the middle of the first conveyor segment and a user places the object onto the first conveyor segment in such a way that this upstream sensor unit is not triggered, and the first conveyor drive conveys the object upstream after being activated in a first direction of rotation, with the result that the first sensor signal is triggered. As a result of the first sensor signal being triggered, the conveyor drive is activated in a second direction of rotation opposite to the first, and this second direction of rotation is stored in the first control unit as the required direction of rotation for downstream conveying.

(c) Another case arises when the first sensor unit is mounted downstream from the middle of the first conveyor segment and a user places the object onto the first conveyor segment in such a way that this downstream sensor unit is not triggered, and the first conveyor drive conveys the object upstream after being activated in a first direction of rotation, with the result that the first sensor signal is not triggered within a first period of time after the first conveyor drive is activated. As a result of the first sensor signal failing to appear, the conveyor drive is activated in a second direction of rotation opposite to the first, and this second direction of rotation is stored in the first control unit as the required direction of rotation for conveying products downstream.

(d) Another case arises when the first sensor unit is mounted upstream from the middle of the first conveyor segment and a user places the object onto the first conveyor segment in such a way that this downstream sensor unit is not triggered, and the first conveyor drive conveys the object downstream after being activated in a first direction of rotation, with the result that the first sensor signal is not triggered within a first period of time after the first conveyor drive is activated. As a result of the first sensor signal failing to appear, the conveyor drive is activated in a second direction of rotation opposite to the first, and this second direction of rotation is stored in the first control unit as the required direction of rotation for conveying products downstream.

In cases (a) and (b), the direction of rotation of the first conveyor drive can be immediately detected by triggering the first sensor signal. In cases (c) and (d), the direction of rotation of the first conveyor drive is detected by expiry of a first period that begins when the first conveyor drive is activated. This list must not be considered exhaustive. Other cases may arise, for example, because sensor units are not mounted uniformly within the first and second conveyor segments or because a user places the object onto the first conveyor segment in such a way that the first sensor unit is triggered as soon as the learning mode is activated.

It is also preferred that the direction of rotation of the first and/or second conveyor drive is reversed when the first and/or second sensor signal fails to appear. This embodiment extends the previously described detection of the direction of rotation. A reversal of the direction of rotation can be triggered by the first, the second, or the first and second sensor signal failing to appear.

It is also preferred that the direction of rotation of the first and/or second conveyor drives is reversed depending on the first and/or second sensor signals failing to appear within a predetermined period after activation of the first conveyor drive. This embodiment extends the previously described detection of the direction of rotation. A reversal of the direction of rotation can thus be triggered by a predetermined period of time elapsing, if the first, the second, or the first and second sensor signals are not triggered within that period.

It is further preferred that the direction of rotation of the first and/or second conveyor drives is reversed by the first and/or second sensor signals being triggered. This embodiment extends the previously described detection of the direction of rotation. A reversal of the direction of rotation can thus be triggered by the first, the second, or the first and second sensor signal appearing.

It is also preferred that reversal of the direction of rotation of the first conveyor drive is triggered on the basis of the first sensor signal, and reversal of the direction of rotation of the second conveyor drive is triggered on the basis of the second sensor signal. This embodiment extends the previously described detection of the direction of rotation. The direction of rotation is reversed, in particular, by a sensor signal from the sensor that is assigned to a particular conveyor segment. For example, the first sensor signal of the first conveyor segment is processed in the first control unit in order to control the first conveyor drive. The same applies analogously for the second sensor signal and the second conveyor drive. It is further preferred that the direction of rotation of the first conveyor drive is stored as a downstream direction of rotation in the first control unit and the direction of rotation of the second conveyor drive is stored as a downstream direction of rotation in the second control unit when the first sensor signal is triggered and is subsequently followed by the second sensor signal being triggered within a first period of time after triggering of the first sensor signal. The direction of rotation of the first conveyor drive and the direction of rotation of the second conveyor drive are then the required directions of rotation for downstream conveying. It is, therefore, preferred that these directions of rotation be stored. In particular, it is preferred that the direction of rotation of the first conveyor drive is stored in the first control unit and that the direction of rotation of the second conveyor drive is stored in the second control unit. This is advantageous, particularly when the conveying device is started up, or configurations are lost due to a sudden loss of power inside the conveying device. The directions of rotation of the conveyor drives, which are detected once by carrying out the installation method for setting up the conveying device, and which convey an article downstream, can be restored in this way.

It is also preferred that the learning mode is terminated after a predetermined number of reversals of the direction of rotation, in particular, that the learning mode is terminated after four reversals of the direction of rotation.

In a case where the first or the second sensor signal is not triggered after repeated reversal of the direction of rotation of the first and/or the second conveyor drives, the direction of rotation is detected incorrectly and unsuccessfully. An error in detecting the direction of rotation may be due, for example, to the object to be conveyed being jammed in a conveyor segment, by the object being too long and unconveyable, or because the object has not been placed on the conveying device at all. After four reversals of the direction of rotation, for example in the first conveyor segment, it can be assumed that it is not possible for the object to be transported by the first conveyor segment. It is very likely that persisting with the method for setting up a conveying device will no longer be successful in this case. It is preferred, instead, that the control unit that repeatedly reversed the direction of rotation sends an error message via bus communication and quits the learning mode, where applicable.

It is also preferred that the object is conveyed by activating the first and the second conveyor drives, preferably by activating all the conveyor drives, and, in particular, by activating all the conveyor drives that are connected to a control unit in which an individual bus address has already been stored.

Conveyor drives of upstream control units that have already received an individual bus address are no longer required for conveying the object and may be switched off. This allows energy to be saved and the progress of the installation method to be visually followed by a user.

Another problem is that the requirements or the contexts of the control units within a conveying device are difficult for the user to identify during initial installation or reinstallation. According to one preferred embodiment, a central processing unit can exchange data with the first and second control units via bus communication, and the central processing unit performs the following steps:

(i) fetching individual bus addresses from the control unit via bus communication;

(ii) determining the neighbourhood relationships of the control units on the basis of the sequence of individual bus addresses;

(iii) storing the neighbourhood relationships in the central processing unit; and (iv) visualising the neighbourhood relationships by means of a graphical user interface.

By means of the neighbourhood relationships, it is possible, in particular, to determine the sequence of conveying devices to be activated with which an article is to be conveyed downstream. A central processing unit can be understood to be a server, a personal computer (PC), or a dedicated processing module with specific programming. Furthermore, a neighbourhood relationship should be understood as control units within a conveying device being spatially adjacent to each other. It is preferable that the central processing unit is able to provide the detected neighbourhood relationships to other systems or to a user. Knowledge about the neighbourhood relationship between conveyor segments and the control units assigned to them is important information for calculating the flow of goods within a conveying device. Collating in a central processing unit all the individual bus addresses of all the control units in a conveyor line allows the conveyor line to be configured and/or monitored from that central processing unit. If the central processing unit is performed by a PC, for example, a computer program running on the PC can retrieve the configurations of the control units by means of their individual bus addresses, can derive the neighbourhood relationships from the bus addresses, and can display these on a graphical display unit to a user. By graphically displaying the neighbourhood relationships and the configurations of the control units, it is possible to retrieve information about the configurations of the conveyor segments of a conveyor line in a short period of time yet with a high level of reliability.

According to another preferred embodiment, the second control unit comprises a first program unit that is in signal communication with the second conveyor drive and the second sensor unit of the second conveyor segment, and a second program unit that is in signal communication with the third conveyor drive and a third sensor unit of a third conveyor segment, and in that the first and second program units are in signal communication inside the second control unit, in particular, in that the first and second program units are in signal communication with a common electric store, and in that the first and second program units inside a control unit detect the direction of rotation of the second and third conveyor drive which conveys the object downstream, wherein the first and second program units replace the first and second control units, respectively, and the program units communicate via signal communication inside the control unit.

A program unit should be understood to be a part of embedded software that is run in a control unit. Such a program unit allows a conveyor drive to be controlled, and a sensor signal from a sensor unit to be monitored. The aim here is to enable a single control unit to control and monitor a first and a second conveyor segment by means of a first and a second program unit. Like control units, these program units are able to detect the direction of rotation of a conveyor drive with the help of sensor signals. The advantage of this embodiment is that it is possible to reduce the number of control units that are required. The program units exchange data about the sensor signals and about the direction of rotation the conveyor drives via a common data store. This common data store is preferably integrated in the control unit. Program units also only exist within a control unit. There is basically no limit to the number of program units that a control unit contains. In one preferred embodiment, a control unit contains four program units for controlling and monitoring four conveyor segments. If data are to be exchanged with other control units, this is done via bus communication, using the embedded software of the control unit.

According to another preferred embodiment, the first control unit is put into the learning mode by: triggering a switch, in particular by triggering a Reed contact or a Hall sensor with a magnetic signal; and receiving a command in the first control unit via bus communication.

According to this embodiment, the control unit can be encapsulated in a housing. This is relevant for applications in which watertight, dust-tight, or gas-tight encapsulation of the control unit is to be achieved. Activating the learning mode on the basis of magnetic fields or commands obviates the need to use mechanical contacts, which are prone to failure, so the reliability of the control units is increased as a result. This embodiment also makes it more difficult to activate the learning mode inadvertently, because either a magnetic object must be brought close to the control unit or a command must be sent via the communication bus. It may also be advantageous if the control unit is put into the learning mode by a user by means of a user interface that sends a command to the first control unit via bus communication. Such a user interface is preferably located in a central processing unit.

According to another preferred embodiment, the individual bus address of the first control unit is manually set by the user beforehand, in the form of a digit sequence, or is predefined by a preconfigured original number. This embodiment is advantageous because it is common practice in conveyor systems to number the conveyor segments in a structured manner in order to make orientation easier for the operating personnel. This is advantageous, for example, whenever maintenance work is to be carried out or defects in individual conveying devices are to be eliminated. For that reason, it is preferred that the first control unit be manually assigned an individual bus address which fits into the numbering system of the conveyor system. Alternatively, a preconfigured original number may be advantageous, because it allows the first control unit to be identified. The individual bus addresses for other control units can then be numbered consecutively, for example.

According to another preferred embodiment, a control unit is assigned an individual plaintext name, in particular in that the first control unit is assigned an individual plaintext name which was manually defined in the form of a character string and/or a digit sequence by the user beforehand, or was predefined by a preconfigured original plaintext name. This plaintext name may consist of characters and/or digits and can preferably be changed consecutively for other control units, said change applying to the character string and/or the digits. The plaintext name may consist, for example, of a unique and easily understood character string containing the name of the conveyor line, followed by a digit sequence which numbers the conveyor segments consecutively. An original plaintext name should be understood to be a plaintext name that has already been assigned to a control unit before any assignment by a user, and which has preferably been stored in a control unit before it is first commissioned. A plaintext name is advantageous, in particular, when maintenance and repair work is to be carried out on a conveying device. Using plaintext names allows conveyor segments to be identified quickly and reliably by plant personnel.

According to another preferred embodiment, a plurality of control units or program units is addressed simultaneously via bus communication using one sub-address, and a plurality of control units having an identical sub-address is put into the learning mode simultaneously, wherein the sub-address is manually defined in the form of a digit sequence by the user beforehand, or was defined by a preconfigured original number.

A sub-address should be understood to be an additional address space for discrete addressing in bus communication, to which the individual bus address is subordinated. The sub-address does not have to be unique. For example, an identical sub-address may be assigned to a plurality of control units. This allows several control units to be addressed simultaneously, and can be applied, for example, when activating the learning mode in other control units. It is possible with this kind of sub-address to define subnets in which groups of control units, for example, a group of control units in a single conveyor line, can be defined and addressed via bus communication using the sub-address.

It is also preferred that the sub-address of a control unit or program unit is a digit sequence that is manually set by the user beforehand or is a preconfigured original number. This embodiment is advantageous because it is common practice in conveyor systems to number the conveyor segments in a structured manner in order to make orientation easier for the operating personnel. This is advantageous, for example, whenever maintenance work is to be carried out or defects in individual conveying devices are to be eliminated. For that reason, it is preferred that control units or program units are manually assigned a sub-address that fits into the numbering system of the conveyor system. Alternatively, a preconfigured original number may be advantageous, because it can be assigned, for example, to an unconfigured control unit of a group of unconfigured control units.

According to another preferred embodiment, conveying parameters are assigned to the first conveyor segment in a first parameterising step, in that respective conveying parameters are stored in the first control unit, and, preferably, that the conveying parameters of the first control unit are stored in the second control unit after the second sensor signal is triggered by the object.

Conveying parameters should be understood to be parameters that affect how the object is conveyed and that are parameters of the conveyor segment. Examples of such conveying parameters are the direction of rotation, the rotational speed, the acceleration curves, and the delay curves of the conveyor drives. These conveying parameters are stored in the first control unit in a separate parameterising step, carried out by a user, for example. The conveying parameters can be stored via bus communication or by entering them directly and manually at a control unit. The conveyor segments of a conveyor line have the same conveying parameters in many cases. It is, therefore, preferred that the conveying parameters stored in the first control unit are transferred to the second control unit and are stored in the second control unit after the second sensor signal is triggered. Accordingly, the setting up of conveyor lines is simplified in this way, because the conveying parameters are copied automatically into every other control unit. This also ensures that all the conveyor segments of a conveyor line receive the same conveying parameters.

According to another preferred embodiment, a control unit signals: termination of the learning mode, and/or incorrect detection of the direction of rotation visually and/or acoustically, in that the control unit of a conveyor segment emits optical signals which are generated by light-emitting components of the control unit of the conveyor segment, and/or controls a predetermined sequential pattern of activating and deactivating the conveyor drive of the conveyor segment, and/or activates an electroacoustic sound transducer which is integrated in the control unit.

According to this embodiment, a visual and/or acoustic user interface is provided. This user interface is provided to allow the state of the learning mode, in particular, the termination of the learning mode, to be displayed to a user and/or to allow incorrect detection of the direction of rotation to be signalled to the user. Visual signalling can take the form of optical signals produced by appropriate light sources such as light-emitting diodes or flashlights, or a predetermined sequence of activating and deactivating a conveyor drive of a conveyor segment. An example of such a sequence is one in which the conveyor drive is activated by the control unit for one second and deactivated for three seconds. This sequence can be repeated a predetermined number of times or can be terminated when a particular condition is met, for example, when the learning mode is terminated. It may also be preferable that an acoustic signal signals termination of the learning mode and/or incorrect detection of the direction of rotation. This acoustic signal may be emitted by an electroacoustic transducer which is preferably integrated and encapsulated in a control unit. The advantage of acoustic signalling is that there is no need for visual contact with the control unit.

According to another aspect of the invention, the problem initially specified is solved by a device, in particular, by a conveying device.

The method is implemented by a conveying device comprising a first control unit which controls an upstream first conveyor segment and a second control unit which controls a downstream second conveyor segment, said first conveyor segment comprising a first conveyor drive for conveying an object through the first conveyor segment and a first sensor unit for detecting an object at a position within the first conveyor segment, and said second conveyor segment comprising a second conveyor drive for conveying an object through the second conveyor segment and a second sensor unit for detecting an object at a position within the second conveyor segment. The first conveyor drive and the first sensor unit are adapted to be in signal communication with the first control unit, the second conveyor drive and the second sensor unit are adapted to be in signal communication with the second control unit, the first and the second control unit are adapted to be in signal communication with each other via bus communication, and the first conveyor segment is adapted to be able to place an object onto the first conveyor segment.

The first and second control unit are adapted to be put into a learning mode, the first and second control unit being adapted to activate the first and second conveyor drive, and the second control unit being adapted to store an installation parameter, depending on the first and/or second sensor signal being triggered.

The conveying device may also be developed by the first control unit being adapted to generate a delivery message containing bus address information, the first control unit being adapted to send a delivery message via bus communication to the second control unit, and the second control unit being adapted to receive a delivery message via bus communication from the first control unit, the second control unit being adapted to derive an individual bus address from the bus address information and to store the individual bus address as an installation parameter when a second sensor signal is triggered by the object.

The conveying device may also be developed by the first control unit being adapted to detect triggering of the first and/or second sensor signal, the first and/or second control unit being adapted to reverse the direction of rotation of the first and/or the second conveyor drive depending on the first and/or second sensor signal, the first control unit being adapted to store in the first control unit a direction of rotation of the conveyor drive as a downstream direction of rotation.

The conveying device may also be developed by the first control unit being adapted to expect a first sensor signal from the first sensor unit, the second control unit being adapted to expect a second sensor signal from the second sensor unit, the first control unit being adapted to reverse the direction of rotation of the first conveyor drive when the first sensor signal fails to appear, the first and second control unit being adapted to reverse the direction of rotation of the first and/or second conveyor drive depending on the first and/or second sensor signal failing to appear within a predetermined period after activation of the first conveyor drive, the first control unit being adapted to store a direction of rotation of the first conveyor drive when the first sensor signal is triggered, the second control unit being adapted to store a direction of rotation of the second conveyor drive when the second sensor signal is triggered, and the second control unit being adapted to reverse the direction of rotation of the second conveyor drive when the second sensor signal fails to appear.

The conveying device can also be developed by the first or the second control unit being adapted to terminate the learning mode after a predetermined number of reversals of the direction of rotation.

The conveying device can also be developed by a central processing unit being adapted to fetch individual bus addresses from the control units via bus communication, to determine neighbourhood relationships of the control units from the sequence of individual bus addresses, to store neighbourhood relationships, and to visualise neighbourhood relationships by means of a graphic user interface.

The conveying device may also be developed by adapting a control unit to put a first program unit into signal communication with the second conveyor drive and a second sensor unit of a second conveyor segment, to put a second program unit into signal communication with the third conveyor drive and a third sensor unit of a third conveyor segment, to put the first and second program units into signal communication inside the control unit, in particular to put the first and second program units into signal communication with a common electric store, to detect the direction of rotation of the third and the fourth conveyor drive by means of the program units, the second control unit being adapted to allow the program units to be in signal communication inside the second control unit, and the first and second program units being adapted to communicate via signal communication.

The conveying device may also be developed by the first control unit being adapted to be put into the learning mode by triggering a switch, in particular by triggering a Reed contact or a Hall sensor with a magnetic signal, wherein the first control unit is adapted to be put into the learning mode by receiving a command via bus communication.

The conveying device may also be developed by adapting the first control unit to receive an individual bus address manually assigned by the user, or to store a preconfigured original number.

The conveying device may also be developed such that a control unit is adapted to assign an individual plaintext name which is a character string and/or a digit sequence or to assign a preconfigured original number.

The conveying device may also be developed such that a control unit is adapted to be addressed via bus communication using one sub-address, wherein the sub-address is manually defined in the form of a digit sequence by the user beforehand, or is a preconfigured original number.

The conveying device may also be developed such that conveying parameters are assigned to the first conveyor segment in a parameterising step, and the first control unit is adapted to store the respective conveying parameters, wherein the second control unit is adapted to store the conveying parameters of the first control unit after the second sensor signal is triggered by the object.

The conveying device may also be developed such that a control unit is adapted to emit optical signals which are generated by light-emitting components of the control unit of the conveyor segment, to activate and to deactivate the conveyor drive of a conveyor segment in a predetermined sequential pattern, and/or to activate an electroacoustic sound transducer when the learning mode is terminated and/or when the direction of rotation is incorrectly detected.

With regard to the manner of operation, the advantages and the variants of the conveying device according to the invention, reference is made to the method features corresponding to the device features, and to the associated passages in the description above.

BRIEF DESCRIPTION OF THE DRAWINGS

Preferred embodiments of the invention shall now be described with reference to the attached Figures, in which.

DETAILED DESCRIPTION OF THE PREFERRED EMBODIMENTS

Figure 1:
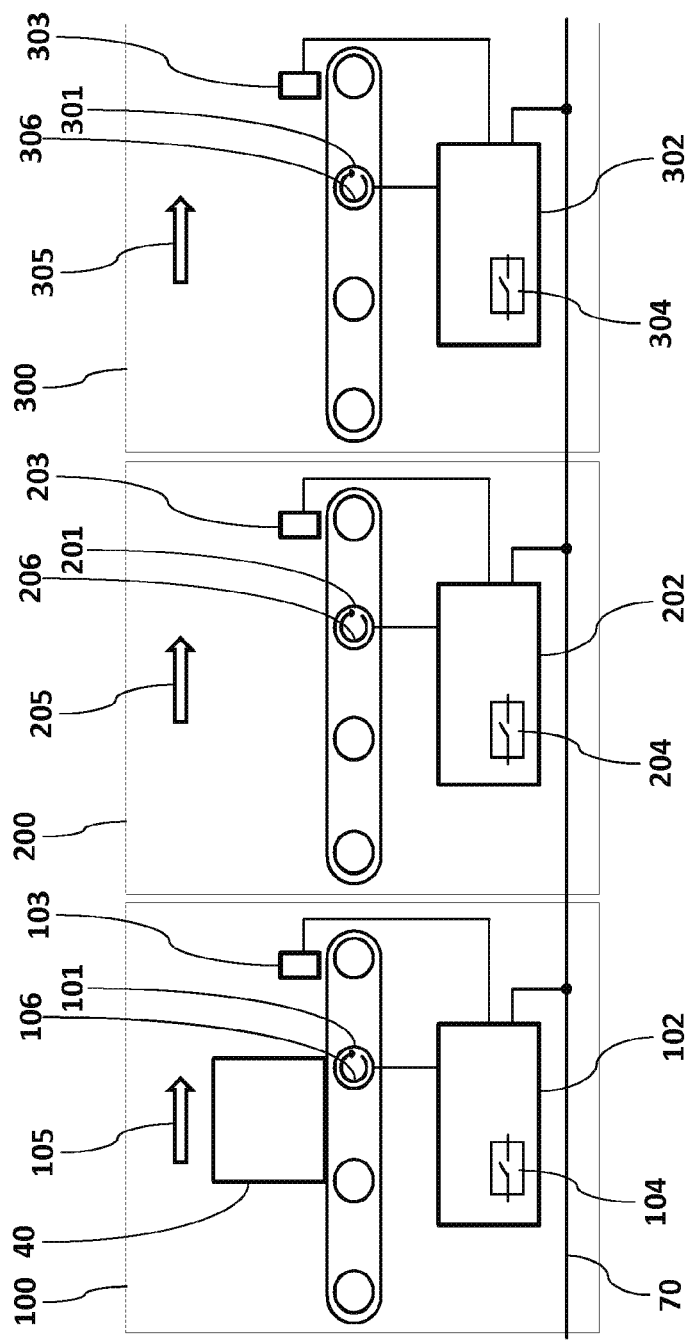
FIG. 1 is a schematic view of a conveyor line consisting of a first and a second conveyor segment and a third presaged conveyor segment, with sensor units mounted downstream.

As referenced in the Figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

FIG. 1 shows a detail of a conveying device consisting of a total of three conveyor segments 100, 200, 300. Conveyor segments 100, 200 are immediately adjacent to each other and form a conveyor line. The presence of conveyor segment 300 is not obligatory.

Each conveyor segment 100, 200, 300 contains a conveyor drive 101, 201, 301, that drives the idle rollers of the conveyor segment via belts, thus conveying article 40. The conveying direction 105, 205, 305 is determined by the direction of rotation 106, 206, 306 of conveyor drives 101, 201, 301. The direction of rotation is configured in such a way that the article is conveyed downstream.

Each conveyor segment also has a control unit 102, 202, 302, each having a Hall sensor 104, 204, 304 for activating the learning mode.

A sensor unit 103, 203, 303 mounted downstream from the middle of the conveyor segment is connected to each control unit 102, 202, 302. This sensor unit is arranged so that it is possible to check for the presence of an article in the exit area of the individual conveyor segments.

Conveyor drives 101, 201, 301 are also connected to control units 103, 203, 303.

Data can be exchanged between the control units via bus communication 70.

FIG. 1 shows in a schematic view the initial state of a setup process. A user has placed an article on the first conveyor segment 100 and can activate the learning mode by moving a magnet (not shown in FIG. 1) close to Hall sensor 104. As a result of activation, a command is sent via bus communication 70 to the other conveyor segments 200, and optionally to 300, with the result that control units 202, and optionally 302, are also put into the learning mode.

FIGS. 2a-2f show an example of how the method according to the invention proceeds.

Figure 2:
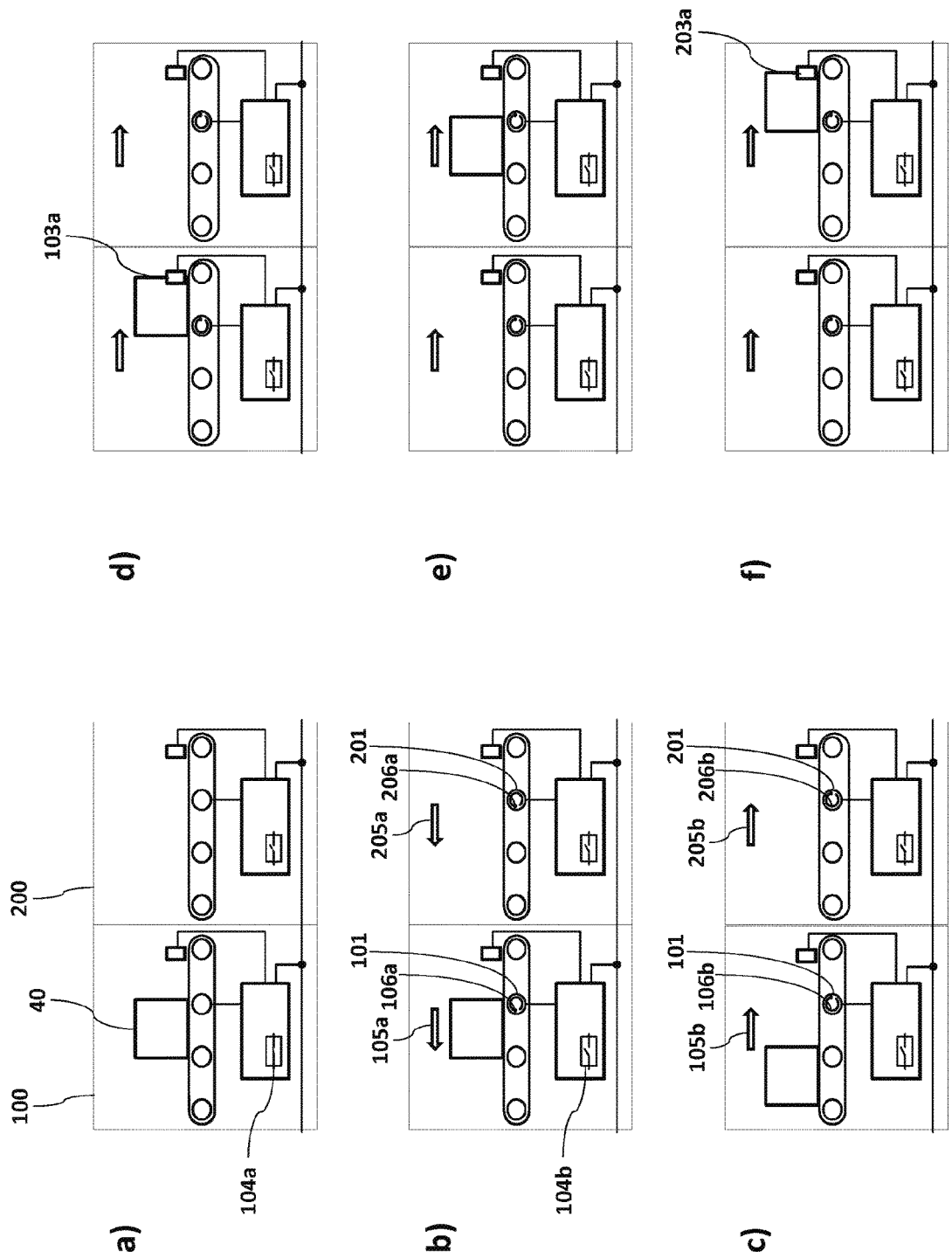
FIGS. 2a-2f are examples of the method according to the invention operating, with downstream sensor units.

FIG. 2a shows an example of the initial situation before proceeding through the method according to the invention. Two conveyor segments 100, 200 are shown. There is an article 40 on conveyor segment 100. Hall sensor 104a of the first control unit 102 has already been activated by holding a magnet close to it, as symbolised by the closed switch contact.

In FIG. 2b, the magnet has been taken away from Hall sensor 104b, as symbolised by the open switch contact. When this switch contact is opened, the learning mode is activated and conveyor drive 101 is activated with a first direction of rotation 106a. Conveyor drive 201 is likewise activated, by means of a command that is transferred via bus communication to the control unit 202 of conveyor segment 200, and has the direction of rotation 206a. Conveying device 105a, 205a is thus formed by the two conveyor segments, with the result that the article is conveyed.

FIG. 2c shows the step that is performed after a first period has elapsed, during which the first control unit 102 has not received a signal from the first sensor unit 103. As a consequence, the directions of rotation of the conveyor drives are reversed by the control units 102, 202, 302, resulting in conveyor drives 101, 201 having the directions of rotation 106b, 206b. Following the reversal of the direction of rotation, the article is conveyed in the downstream direction as originally installed.

If, as shown in FIG. 2d, sensor unit 103a of the first conveyor segment 100 is activated, the directions of rotation 106b, 206b of the conveyor drives 101, 201, 301 are stored as the new preferred direction of rotation in the control units 102, 202, 302.

As FIG. 2e clearly illustrates, the article is still being conveyed downstream.

FIG. 2f shows the step of activating second sensor unit 203a, according to the method. As a result of this activation, an individual bus address is finally generated, which differs by the value one from the individual bus address of the first control unit 102 and is stored in the second control unit 202. A command is additionally sent to the first control unit 102, signalling that the second sensor unit 203 of the second conveyor segment 200 has been activated. From that moment onwards, the first and second conveyor segments 100, 200 are configured so that the direction of rotation of the conveyor drives 101, 201 which convey the article downstream are detected, the conveyor segments 100, 200 can be addressed via bus communication, and the neighbourhood relationship can be derived from their bus addresses.

Figure 3:
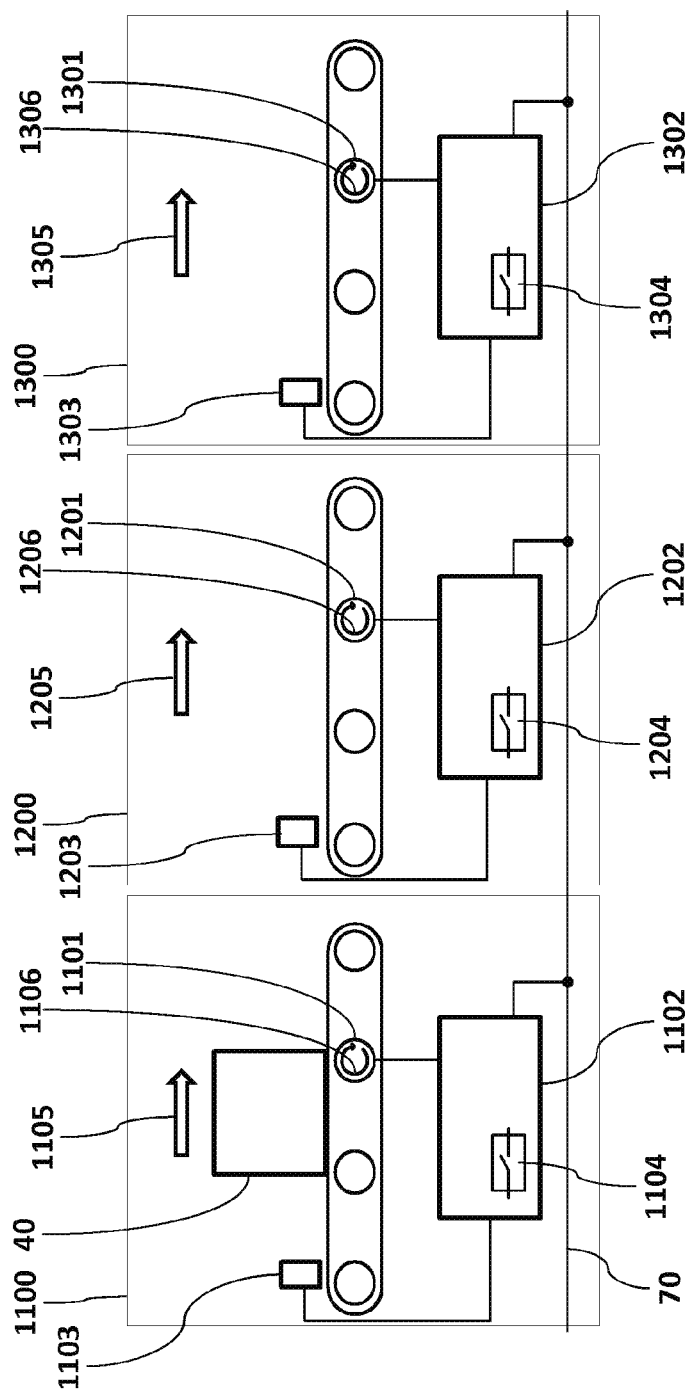
FIG. 3 is a schematic view of a conveyor line consisting of a first and a second conveyor segment and a third presaged conveyor segment, with sensor units mounted upstream.

A conveying device consisting of a total of three conveyor segments—1100, 1200, 1300 is shown in FIG. 3. Conveyor segments 1100, 1200 are immediately adjacent to each other and form a conveyor line. The presence of conveyor segment 1300 is not obligatory, as indicated by the dotted lines used for segment 1300.

Each conveyor segment 1100, 1200, 1300 contains a conveyor drive 1101, 1201, 1301 that drives the idle rollers of the conveyor segment via belts, thus conveying article 40. The conveying direction 1105, 1205, 1305 is determined by the direction of rotation 1106, 1206, 1306 of conveyor drives 1101, 1201, 1301. The direction of rotation is configured in such a way that the article is conveyed downstream.

Furthermore, each conveyor segment has a control unit 1102, 1202, 1302 containing a Hall sensor 1104, 1204, 1304 for activating the learning mode.

A sensor unit 1103, 1203, 1303 mounted upstream from the middle of the conveyor segment 1100, 1200, 1300 is connected to said control unit 1102, 1202, 1202. This sensor unit 1103, 1203, 1303 is arranged so that it is possible to check for the presence of an article in the entry area of the individual conveyor segments.

Conveyor drives 1101, 1201, 1301 are also connected to control units 1103, 1203, 1303.

Data can be exchanged between the control units 1103, 1203, 1303 via bus communication 70.

FIG. 3 shows in a schematic view the initial state of a setup process. A user has placed an article on the first conveyor segment 1100 and can activate the learning mode by moving a magnet (not shown in FIG. 3) close to Hall sensor 1104. As a result of activation, a command is sent via bus communication 70 to control units 1202, and optionally 1302, with the result that the latter are put into the learning mode.

FIGS. 4a-4f show an example of how the method according to the invention proceeds.

Figure 4:
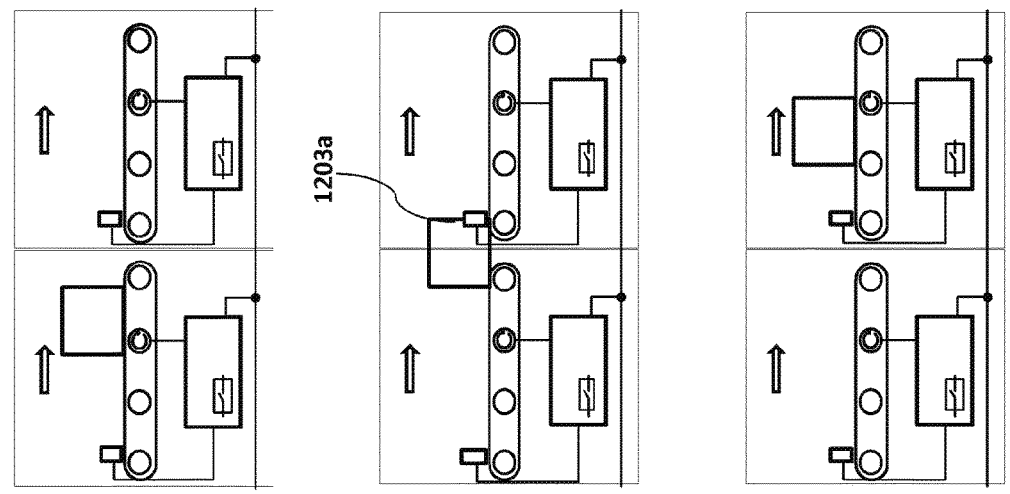
FIGS. 4a-4f are examples of the method according to the invention operating, with upstream sensor units.
Figure 4:
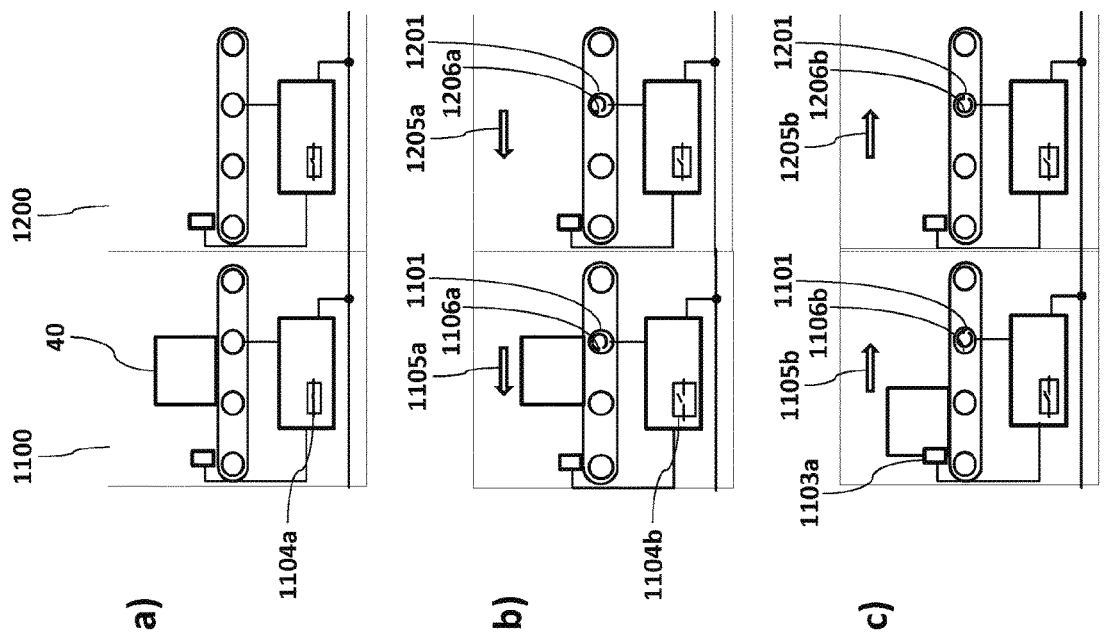

FIG. 4a shows an example of the initial situation before proceeding through the method according to the invention. Two conveyor segments 1100, 1200 are shown. There is an article 40 on conveyor segment 1100. Hall sensor 1104a of the first control unit has already been activated by holding a magnet close to it, as symbolised by the closed switch contact.

In FIG. 4b, the magnet has been taken away from Hall sensor 1104b, as symbolised by the open switch contact. When this switch contact is opened, the learning mode is activated and conveyor drive 1101 is activated with a first direction of rotation 1106a. Conveyor drive 1201 is likewise activated, by means of a command which is transferred via bus communication to the control unit of conveyor segment 1200, and has the direction of rotation 1206a. Conveying device 1105a, 1205a is thus formed by the two conveyor segments, with the result that the article is conveyed.

The step of the method in which the activation of sensor unit 1103a is triggered is shown in FIG. 4c. As a consequence, the directions of rotation of the conveyor drives are reversed by the control units, resulting in the conveyor drives having the directions of rotation 1106b and 1206b. The new directions of rotation 1106b and 1206b of the conveyor drives are stored as new preferred directions of rotation in the control units. Following the reversal of the direction of rotation, the article is conveyed in the downstream direction as originally installed.

The article is then conveyed further downstream, as FIG. 4d illustrates.

In FIG. 4e, sensor unit 1203a of the second conveyor segment is activated, as a result of which an individual bus address is generated which differs by the value one from the individual bus address of the first control unit and which is stored in the second control unit. A command is additionally sent to the first control unit, signalling that the second sensor unit of the second conveyor segment has been activated. From that moment onwards, the first and second conveyor segments are configured so that the direction of rotation of the conveyor drives which convey the article downstream are detected, the conveying devices can be addressed via bus communication, and the neighbourhood relationship can be derived from their bus addresses.

FIG. 4f shows the continued conveying of the article.

Figure 5:
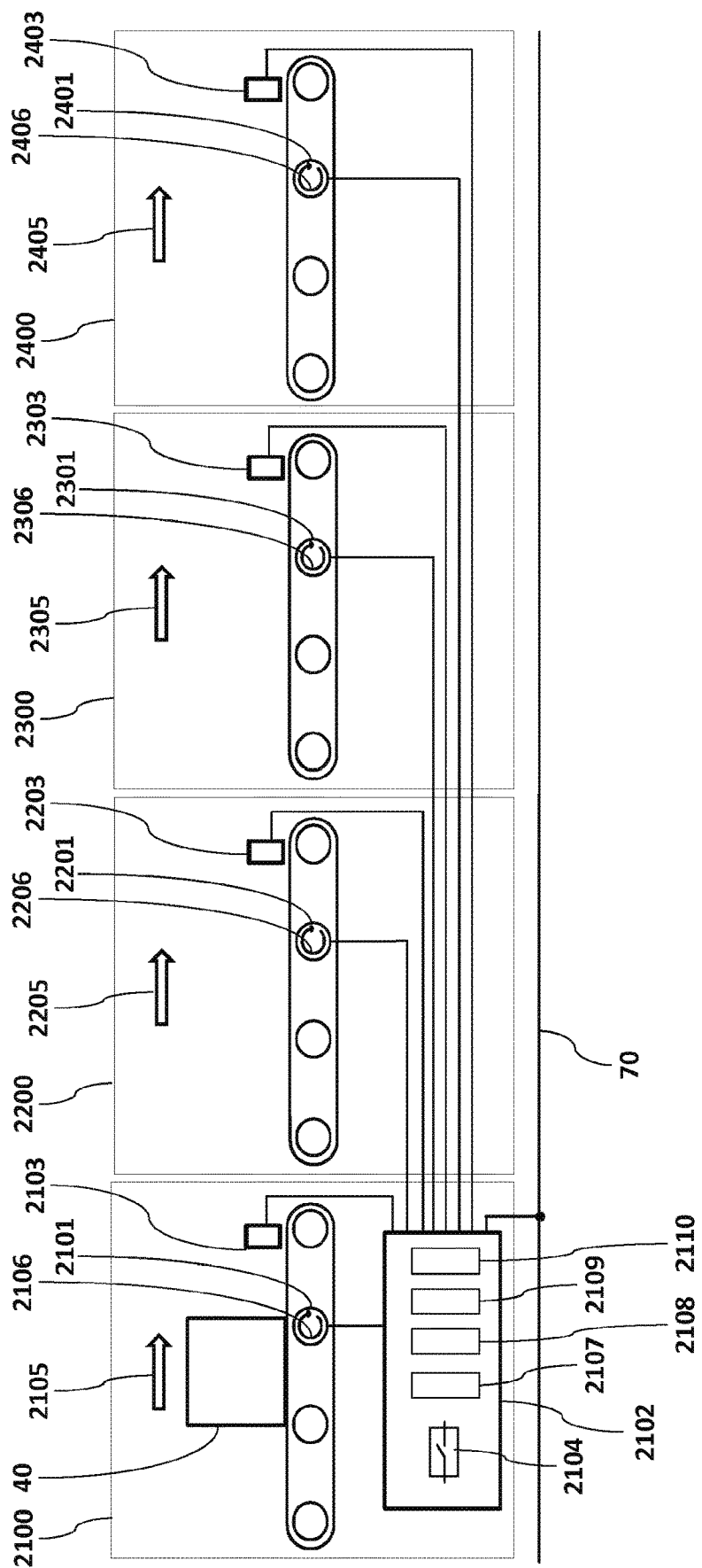
FIG. 5 is a schematic view of a conveyor line consisting of a control unit with four program units for controlling four conveyor segments.

FIG. 5 shows a conveying device in which a control unit 2102 controls a plurality of conveyor segments 2100, 2200, 2300, 2400, said control being performed by program units 2107, 2108, 2109, 2110 that are executed inside control unit 2102. Program units 2107, 2108, 2109, 2110 control conveyor drives 2101, 2201, 2301, 2401 and control the direction of rotation 2106, 2206, 2306, 2406 of the conveyor drives in order to convey an article 40 downstream. By reversing the direction of rotation 2106, 2206, 2306, 2406, the program units can control conveying directions 2105, 2205, 2305, 2405 in conveyor segments 2100, 2200, 2300, 2400. Program units 2107, 2108, 2109, 2110 also analyse the signals from sensor units 2103, 2203, 2303, 2403. The program units 2107, 2108, 2109, 2110 can exchange data within the control unit 2102, in order to detect the direction of rotation of the conveyor drives, for example. Control unit 2102 is also integrated into bus communication 70 and allows data to be exchanged with other control units, for example.

Figure 6:
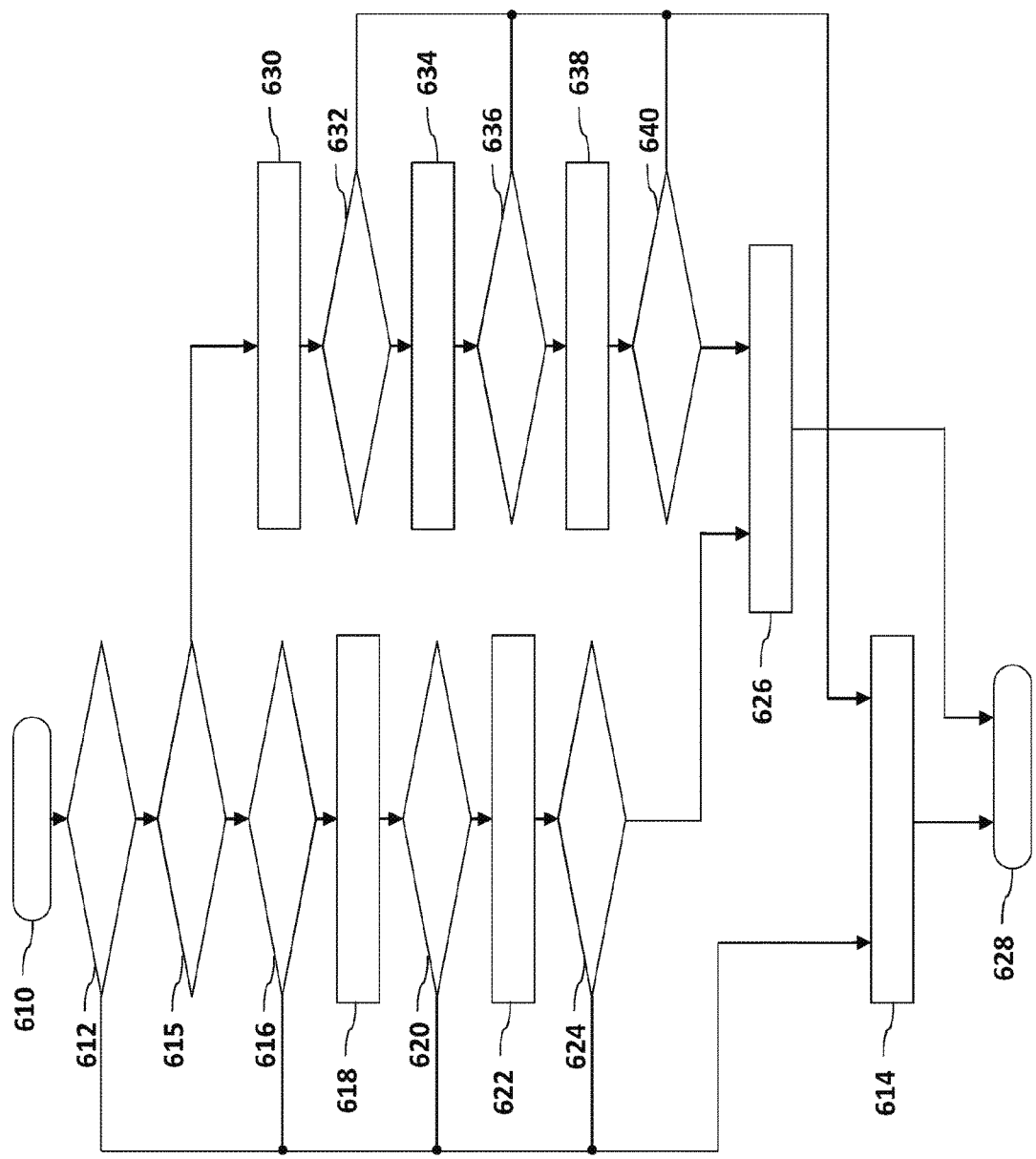
FIG. 6 is a flow diagram for detecting the direction of rotation of the conveyor drives.

FIG. 6 shows an example of how the direction of rotation of the conveyor drives is detected. The method begins with a start element 610 and checks in a test step 612 whether the first and the second sensor units were activated within a first period of time by conveying of the object. If the first and the second sensor units were activated within a first period of time, step 614 is carried out. In step 614, the direction of rotation of the first conveyor drive is stored in the first control unit, and the direction of rotation of the second conveyor drive is stored in the second control unit. After that, the method for detecting the direction of rotation of the conveyor drive ends in step 628. If activation of the first and second sensor units is not detected in test step 612, then test step 615 is performed to check whether the first sensor unit was activated within a first period of time. If the first sensor unit was not activated within a first period of time, test step 616 is performed to check whether the second sensor unit was activated within the first period of time. If the second sensor unit was activated within the first period of time, then step 614 is performed, in which the direction of rotation of the first conveyor drive is stored in the first control unit and the direction of rotation of the second conveyor drive is stored in the second control unit. After that, the method ends in step 628.

If no activation of the second sensor unit is detected in test step 616, then step 618 is performed, in which the direction of rotation of the first conveyor drive is reversed by the first control unit. In test step 620 that follows, it is checked whether the second sensor unit was activated within a first period of time. If the second sensor unit was activated within a first period of time, then step 614 is performed, in which the direction of rotation of the first conveyor drive is stored in the first control unit and the direction of rotation of the second conveyor drive is stored in the second control unit. After that, the method ends in step 628. If, in step 620, the second sensor unit is not activated within a first period of time, then step 622 is carried out. In step 622, the direction of rotation of the second conveyor drive is reversed by the second control unit. In test step 624 that follows, it is checked whether the second sensor unit was activated by the object within a first period of time. If the second sensor unit was activated by the object, then step 614 is performed, in which the direction of rotation of the first conveyor drive is stored in the first control unit and the direction of rotation of the second conveyor drive is stored in the second control unit. After that, the method ends in step 628. If, in step 624, the second sensor unit is not activated within a first period of time, then step 626 is carried out. In step 626, an error message is generated because the method could not detect any combination of directions of rotation that convey the object in such a way that the first and the second control unit are activated by the object within a first period of time. Step 626 is followed by step 628, in which the method ends.

If, in test step 615, the first sensor unit is activated within a first period of time, then step 630 is subsequently carried out, in which the direction of rotation of the second conveyor drive is reversed. In test step 632 that follows, it is checked whether the second sensor unit was activated within a first period of time. If the second sensor unit was activated, step 614 is performed, in which the direction of rotation of the first conveyor drive is stored in the first control unit and the direction of rotation of the second conveyor drive is stored in the second control unit. After that, the method ends in step 628. If, in test step 632, the second sensor unit was not activated within a first period of time, step 634 is carried out, and the direction of rotation of the first conveyor drive is reversed by the first control unit. In test step 636 that follows, it is checked whether the second sensor unit was activated within a first period of time. If the second sensor unit was activated within a first period of time, then step 614 is performed, in which the direction of rotation of the first conveyor drive is stored in the first control unit and the direction of rotation of the second conveyor drive is stored in the second control unit. After that, the method ends in step 628. If, in step 636, the second sensor unit is not activated within a first period of time, then step 638 is carried out. In step 638, the direction of rotation of the second conveyor drive is reversed by the second control unit. In test step 640 that follows, it is checked whether the second sensor unit was activated within a first period of time. If the second sensor unit was activated within a first period of time, then step 614 is performed, in which the direction of rotation of the first conveyor drive is stored in the first control unit and the direction of rotation of the second conveyor drive is stored in the second control unit. After that, the method ends in step 628.

If, in step 640, the second sensor unit is not activated within a first period of time, then step 626 is carried out. In step 626, an error message is generated because the method could not detect any combination of directions of rotation that convey the object in such a way that the first and the second control unit are activated by the object within a first period of time. Step 626 is followed by step 628, in which the method ends.

Figure 7:
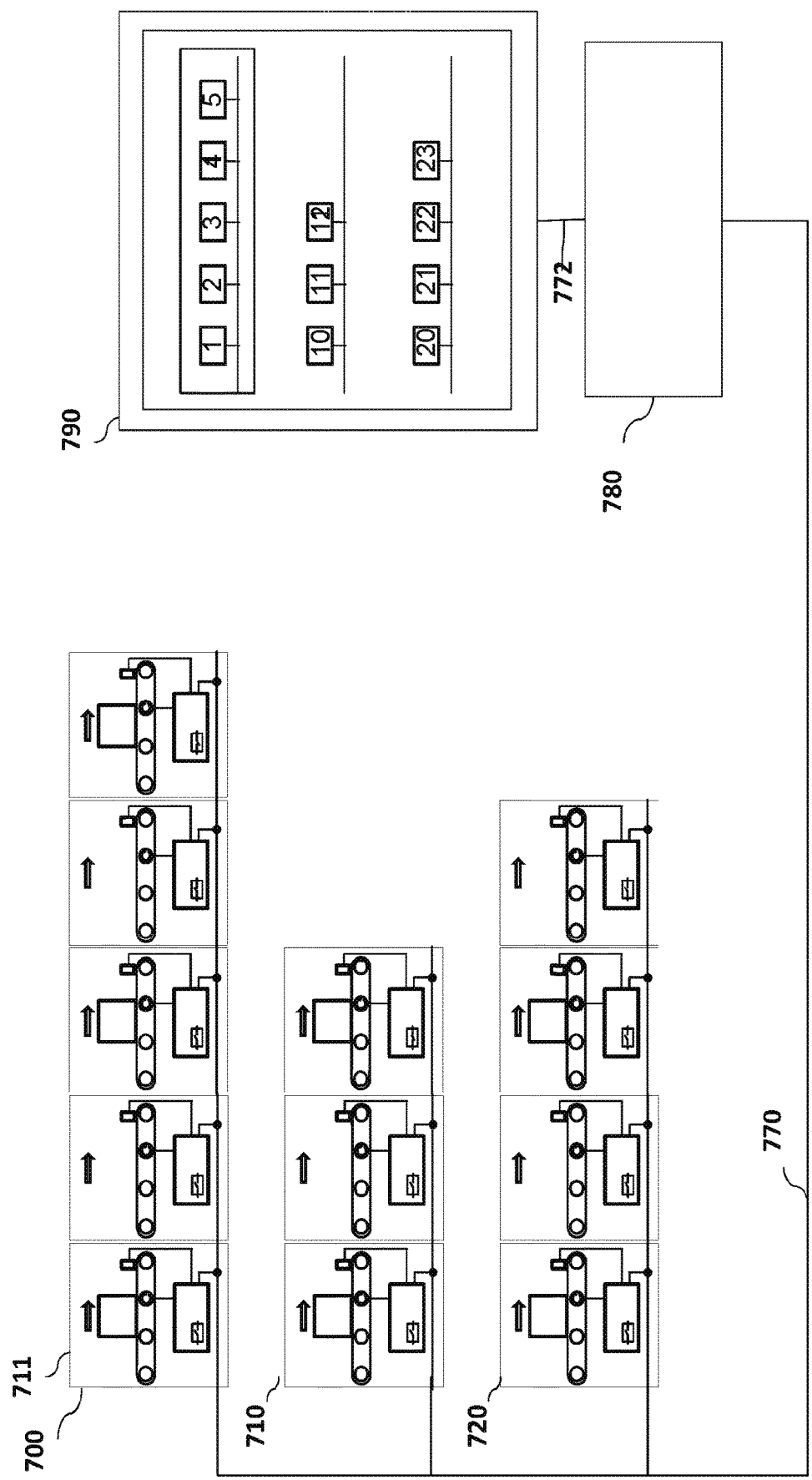
FIG. 7 is a schematic view of the visualisation of the neighbourhood relationships.

FIG. 7 shows, by way of example, a schematic view of the visualisation of the neighbourhood relationships. Conveyor lines 700, 710, 720 consist of different numbers of conveyor segments. The control units of all the conveyor segments are integrated into bus communication 770. A central processing unit 780 is also integrated into the bus communication. Via the bus communication, this central processing unit can fetch the addresses from the control units and determine the neighbourhood relationships. The central processing unit is in signal communication via an electric connection 772 with a visual display unit 790. The neighbourhood relationships are visualised by means of said display unit 790. An individual bus address fetched from the control unit of conveyor segment 701 can be displayed in a suitable presentation form 711. This can be done analogously for all the other conveyor segments. Membership of a conveyor line, for example conveyor line 700, can be represented for each conveyor segment by means of the sub-address of a control unit and can be displayed on the visual display unit in a suitable form of presentation 712 for the sub-addresses.

It will be understood by one having ordinary skill in the art that construction of the described present disclosure and other components is not limited to any specific material. Other exemplary embodiments of the disclosure disclosed herein may be formed from a wide variety of materials, unless described otherwise herein.

For purposes of this disclosure, the term "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that many modifications are possible, e.g., variations in sizes, dimensions, structures, shapes and proportions of the various elements, values of parameters, mounting arrangements, use of materials, colors, orientations, etc. without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure and method without departing from the concepts of the present disclosure, and further it is to be understood that such concepts are intended to be covered by the following claims unless these claims by their language expressly state otherwise.

The invention claimed is:

1. A method for setting up a control unit in a conveying device, wherein a first control unit controls an upstream first conveyor segment and a second control unit controls a downstream second conveyor segment spatially adjacent the first conveyer segment in a conveying direction, said first conveyor segment comprising:
   a first conveyor drive for conveying an object through the first conveyor segment;
   a first sensor unit for detecting an object at a position within the first conveyor segment;
   wherein said second conveyor segment comprising:
   a second conveyor drive for conveying an object through the second conveyor segment, wherein the second conveyor drive is downstream of the first conveyor drive;
   a second sensor unit for detecting an object at a position within the second conveyor segment, wherein the second conveyor sensor is downstream of the first conveyor sensor; and
   wherein the first conveyor drive and the first sensor unit are in signal communication with the first control unit in order to control the first conveyor drive and to receive a first sensor signal from the first sensor unit, and
   the second conveyor drive and the second sensor unit are in signal communication with the second control unit in order to control the second conveyor drive and to receive a second sensor signal from the second sensor unit; and
   wherein the first and the second control unit are in signal communication with each other via bus communication, said method comprising the following steps:
   placing an object onto the first conveyor segment;
   activating a learning mode in the first and second control unit;
   activating the first and second conveyor drive by means of the respective first and second control unit;
   automatically conveying the object in the direction of the second conveyor segment; and
   storing an installation parameter in the second control unit depending on the triggering of the first sensor signal above or in combination with the second signal.

2. The method pursuant to claim 1, wherein conveying parameters are assigned to the first conveyor segment in a first parameterising step, wherein respective conveying parameters are stored in the first control unit.

3. The method pursuant to claim 1, wherein conveying parameters of the first control unit are stored in the second control unit after the second sensor signal is triggered by the object.

4. The method pursuant to claim 1, wherein the second control unit signals:
   termination of the learning mode;
   incorrect detection of the direction of rotation visually and/or acoustically, in that the control unit of the conveyor segment emits optical signals which are generated by light-emitting components of the control unit of the conveyor segment;

controls a predetermined sequential pattern of activating and deactivating the conveyor drive of the conveyor segment; and/or activates an electroacoustic sound transducer which is integrated in the control unit.

5. The method pursuant to claim 1, wherein storing an installation parameter in the second control unit further comprises:

generating in the first control unit a delivery message containing bus address information, sending the delivery message from the first to the second control unit by means of the bus communication, and assigning an individual bus address derived from the bus address information to the second control unit by storing the individual bus address as an installation parameter in the second control unit when a second sensor signal is triggered by the object.

6. The method pursuant to claim 5, wherein an individual bus address of the first control unit is manually defined in the form of a digit sequence by the user beforehand.

7. The method pursuant to claim 5, wherein an individual bus address of the first control unit was defined by a preconfigured original number.

8. The method pursuant to claim 1, wherein a central processing unit can exchange data with the first and second control unit via bus communication;

wherein the central processing unit performs the following steps:

fetching individual bus addresses from the control units via bus communication;

determining neighbourhood relationships of the control units on the basis of the sequence of individual bus addresses;

storing the neighbourhood relationships in the central processing unit; and visualising the neighbourhood relationships by means of a graphical user interface.

9. The method pursuant to claim 8, wherein a control unit is assigned an individual plaintext name.

10. The method pursuant to claim 8, wherein a control unit is assigned an individual plaintext name which was manually defined in the form of a character string or a digit string by the user beforehand.

11. The method pursuant to claim 8, wherein a control unit was predefined by a preconfigured original plaintext name.

12. The method pursuant to claim 8, wherein a plurality of control units is addressed simultaneously via bus communication using one sub-address, wherein the plurality of control units having an identical sub-address is put into the learning mode simultaneously; and wherein the sub-address is manually defined in the form of a digit sequence by the user beforehand, or was defined by a preconfigured original number.

13. The method pursuant to claim 12, wherein the sub-address was defined by a preconfigured original number.

14. The method pursuant to claim 1, wherein the second control unit comprises:

a first program unit which is in signal communication with the second conveyor drive and the second sensor unit of the second conveyor segment, and a second program unit that is in signal communication with a third conveyor drive and a third sensor unit of a third conveyor segment.

15. The method pursuant to claim 14, wherein the first and second program units are in signal communication with a common electric store.

16. The method pursuant to claim 14, wherein the first control unit is put into the learning mode by triggering a switch.

17. The method pursuant to claim 14, wherein the first control unit is put into the learning mode by triggering a Reed contact or a Hall sensor with a magnetic signal.

18. The method pursuant to claim 14, wherein the first control unit is put into the learning mode by receiving a command in the first control unit via bus communication.

19. The method pursuant to claim 1, wherein a preferred direction of rotation of the first and/or second conveyor drive such that the object conveyed to the downstream second conveyor segment is detected, said detection comprising the following steps:

conveying the object, triggering of the first and/or second sensor signal by the object, detecting by means of the first control unit that the first and/or second sensor signal has been triggered, if necessary, reversing the direction of rotation of the first and/or second conveyor drive, depending on the first and/or second sensor signal, and storing in the first control unit a first or second direction of rotation of the first conveyor drive as a downstream direction of rotation.

20. The method pursuant to claim 19, wherein the direction of rotation of the first or second conveyor drive is reversed by triggering of the first or second sensor signal.

21. The method pursuant to claim 19, wherein the reversal of the direction of rotation of the first conveyor drive is triggered on the basis of the first sensor signal, and the reversal of the direction of rotation of the second conveyor drive is triggered on the basis of the second sensor signal.

22. The method pursuant to claim 19, wherein the direction of rotation of the first conveyor drive is stored as a downstream direction of rotation in the first control unit, and wherein the direction of rotation of the second conveyor drive is stored as a downstream direction of rotation in the second control unit when the first sensor signal is triggered and is subsequently followed by the second sensor signal being triggered within a first period of time after triggering of the first sensor signal.

23. The method pursuant to claim 19, wherein the learning mode is terminated after a predetermined number of reversals of the direction of rotation.

24. The method pursuant to claim 19, wherein the learning mode is terminated after four reversals of the direction of rotation.

25. The method pursuant to claim 19, wherein the object is conveyed by activating the first and the second conveyor drives.

26. The method pursuant to claim 19, wherein the object is conveyed by activating all the conveyor drives.

27. The method pursuant to claim 19, wherein the object is conveyed by activating all the conveyor drives that are connected to a control unit in which a bus address has already been stored.

28. The method pursuant to claim 19, wherein the first and second program units inside a control unit detect the direction of rotation of the second and third conveyor drive that conveys the object downstream, wherein the first and second program units replace the first and second control units, respectively, and the program units communicate via signal communication inside the control unit.

29. The method pursuant to claim 19, wherein the direction of rotation of the first or second conveyor drive is reversed when the first or second sensor signal fails to appear.

30. The method pursuant to claim 29, wherein the direction of rotation of the first or second conveyor drive is reversed depending on the first or second sensor signal failing to appear within a predetermined period after activation of the first conveyor drive.

* * * * *